United States Patent [19]

Cassel et al.

[11] Patent Number: 5,086,838
[45] Date of Patent: Feb. 11, 1992

[54] TAPERED CUTTING TOOL FOR REAMING TUBULAR MEMBERS IN WELL BORE

[75] Inventors: Terry E. Cassel; Gerald D. Lynde, both of Bossier City, La.

[73] Assignee: Baker Hughes Incorporated

[21] Appl. No.: 673,186

[22] Filed: Mar. 21, 1991

Related U.S. Application Data

[63] Continuation-in-part of Ser. No. 290,575, Dec. 27, 1988, Pat. No. 5,038,859, which is a continuation-in-part of Ser. No. 181,812, Apr. 15, 1988, Pat. No. 4,978,260, which is a continuation-in-part of Ser. No. 816,287, Jan. 6, 1986, Pat. No. 4,796,709.

[51] Int. Cl.⁵ .............................................. E21B 29/00
[52] U.S. Cl. .................................... 166/55.6; 408/144
[58] Field of Search .......................... 166/55.6, 55.7; 175/374, 375; 407/62, 66, 100, 116; 408/59, 79-82, 111, 144, 145, 213, 227, 229, 713

[56] References Cited

U.S. PATENT DOCUMENTS

| | | | |
|---|---|---|---|
| 4,984,488 | 1/1991 | Lunde et al. | 166/55.6 X |
| 5,014,778 | 5/1991 | Lunde et al. | 166/55.6 |
| 5,038,859 | 8/1991 | Lunde et al. | 166/55.6 |

*Primary Examiner*—Thuy M. Bui
*Attorney, Agent, or Firm*—Dodge, Bush, Moseley & Riddle

[57] ABSTRACT

A cutting tool (20) has a tool body (26) positioned within a metal casing (12) for reaming the inner peripheral surface of the casing (12) to a uniform smooth inner diameter. Tool body (26) has a lower end body portion (28), a generally cylindrical intermediate body portion (30), and a reduced diameter upper end body portion (22) connected to intermediate body portion (26) by a sloping shoulder (24). Blades (46, 48) have a single column of cutting elements (50) secured thereto in end to end relation to define an outwardly sloping lower column section (51A) along lower end body section (28), a vertical intermediate column section (51B) along intermediate body portion (30) and an inwardly sloping upper column section (51C) along sloping shoulder (34).

19 Claims, 3 Drawing Sheets

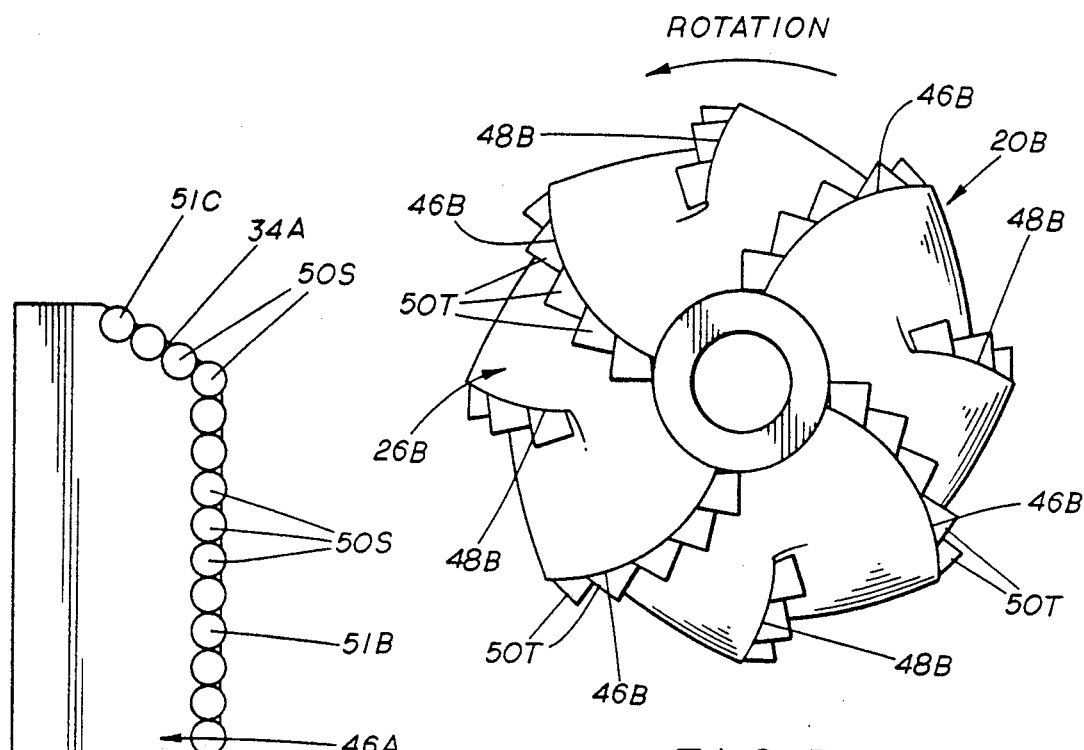
FIG. 7
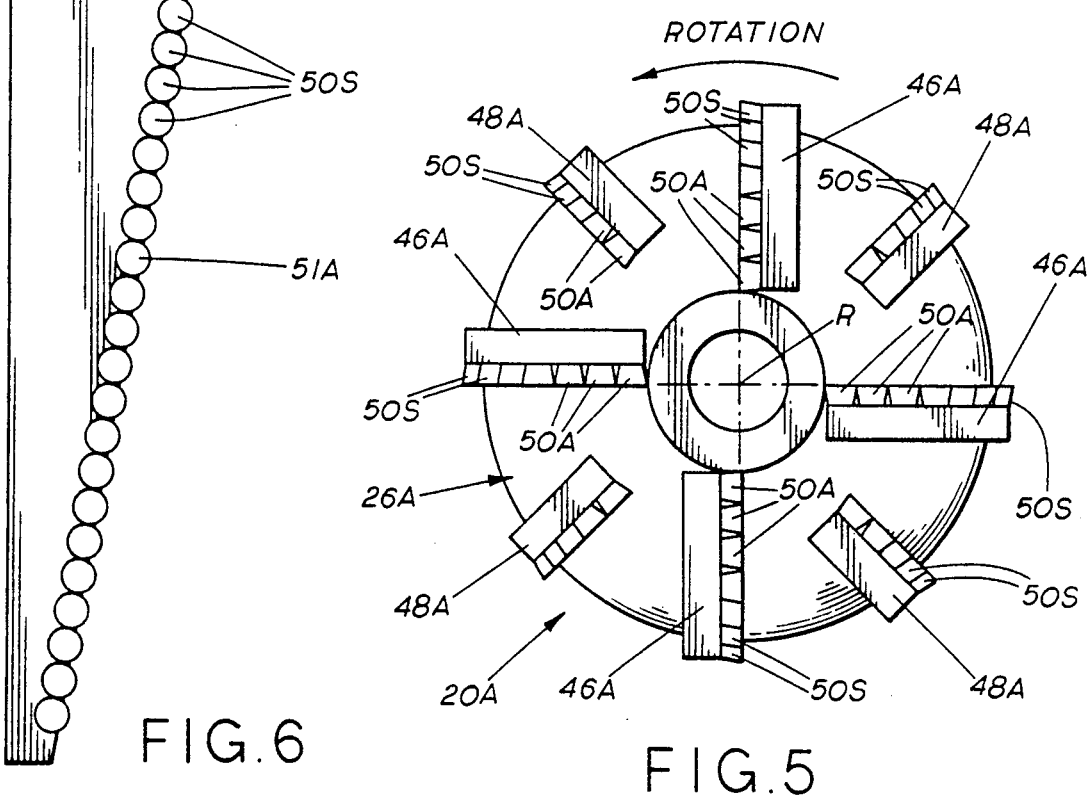
FIG. 6
FIG. 5

TAPERED CUTTING TOOL FOR REAMING TUBULAR MEMBERS IN WELL BORE

CROSS REFERENCE TO RELATED APPLICATIONS

This application is a continuation-in-part of copending application Ser. No. 290,575 filed Dec. 27, 1988 entitled "Improved Cutting Tool For Removing Man-Made Members From Well Bore" now U.S. Pat. No. 5,038,859; which is a continuation-in-part of copending application Ser. No. 181,812 filed Apr. 15, 1988, now U.S. Pat. No. 4,978,260 dated Dec. 18, 1990 entitled "Improved Cutting Tool For Removing Materials From Well Bore"; which is a continuation-in-part of application Ser. No. 816,287, filed Jan. 6, 1986, now U.S. Pat. No. 4,796,709, dated Jan. 10, 1989, entitled "Milling Tool For Cutting Well Casing".

BACKGROUND OF THE INVENTION

This invention relates generally to a tapered cutting or milling tool for reaming or milling out collapsed metal tubular members, dents, and mashed in areas of metal tubular members, such as casing, downhole in a well bore. Such tapered milling tools have also been employed for enlarging or opening tubular members as well as removing burrs from the tubular members.

The tapered milling tools have normally been provided with a plurality of blades extending outwardly from the tool body. In most instances, the blades have been fixed to the tapered tool body but in some instances the blades have been mounted on the tool body for outward swinging movement. However, such prior blades have been formed with tungsten carbide cutting fragments or chips embedded in a random pattern in a matrix formed of a suitable powder metallurgy composite material, such as sintered tungsten carbide in a cobalt matrix to provide the cutting surface, and the cutting elements heretofore have not been arranged or constructed to provide a "chip breaker" action for controlling the length of the metal turnings. As an example of such a cutting tool, a tapered body having blades extending from the side of the tool body and utilizing crushed tungsten carbide particles in a matrix have been used heretofore in reaming or milling out collapsed casing downhole in a well bore.

Milling or cutting tools having blades extending from the tool body and formed with the tungsten carbide chips embedded in a matrix have normally utilized blades for taking a relatively small thickness bite from the metal tubular member to be removed which provides a conglomeration of shapes and sizes or metal turnings including fine hair-like turnings of around 6 inches in length, for example. Such turnings tend to curl and internest with each other to provide a so-called "bird nest" or mass which is difficult to remove from the well bore by drilling fluid after being cut from the metal object. A critical factor in obtaining a high rate of penetration through this restricted area within the casing is being able to maintain a sharp predictable cutting structure and to reduce the bearing surface which forms as the cutting structure is worn away. Heretofore a tapered milling tool included blades along its length dressed with a crushed carbide matrix. Each blade was from 1-2 inches in width and, depending on the size of the milling tools, from 2 to 4 feet in length. As the carbide structure wore away, a large flattened surface forms at the junction of the outer blade surface and casing interference point creating a profile that required increasing loads to force the mill deeper into the swaged in area. Oftentimes, numerous mills would be run to ream through a resisted area because of this deterioration of cutting structure.

SUMMARY OF THE PRESENT INVENTION

U.S. Pat. No. 4,796,709, dated Jan. 10, 1989, and copending application Ser. No. 181,812, filed Apr. 15, 1988, relate to cutting tools which are inserted within a well for removing tubular members progressively from their annular upper ends by first reducing the members into metal turnings or small chips for removal from the well by drilling fluid. Application Ser. No. 290,575 is directed to a cutting tool for removing tubular members downhole from a well bore, such as packers stuck downhole, cemented casing, jammed tools or the like, and includes cutting elements extending from the bottom or lower annular surface of the tool body for cutting.

The improved cutting tool of the present invention includes a tool body having a lower tapered end portion and a generally cylindrical upper end portion with a plurality of spaced columns of cutting elements extending in a generally vertical direction along the lower tapered end portion and the generally cylindrical upper end portion for reaming a collapsed or dented casing downhole in a well bore for the removal of dents, burrs, and mashed in areas from a position inside the tubular member thereby to provide a uniform inside diameter for the tubular member. The lower tapered end portion of the tool body permits the small diameter lower end portion to enter a small diameter opening in the tubular member and to enlarge the opening to the desired diameter or size. A plurality of blades are spaced about the outer periphery of the tool body with each blade having a mounting surface extending in a generally vertical direction for the length of the tool body and being of a transverse width sufficient to support thereon a single column of cutting elements of a similar shape and size. The blades may be milled or cut into the tool body or may be formed separately and then welded or otherwise secured to the tubular tool body. The term "blade" as used in the specification and claims shall be interpreted as including a mounting surface for cutting elements integral with the tool body or a separate blade secured to the tool body. Since the inner surface or periphery of the tubular member is being enlarged to provide a predetermined minimal inner diameter, only a single column of cutting elements on each blade is normally required for smoothing the inner periphery to the predetermined inner diameter for receiving other tools or tubular members.

The tubular tool body has a plurality of blades circumferentially spaced about the tool body with each blade having a column of closely spaced cutting elements secured to the leading supporting surface of the blade, each cutting element in the column being of a predetermined similar size and shape. A generally vertically extending channel is provided on the leading side of each blade to provide a path for the upward flow of cuttings and drilling fluid from the well bore. The cutting elements are preferably positioned on adjacent blades in an offset relation so that different concentric cutting paths of the cutting elements on adjacent blades are provided during the entire milling out operation for smoothing the inner surface of the casing to a predetermined diameter.

In addition, the front cutting face of each cutting element is arranged and constructed to provide a "chip breaker" action for effecting a breaking of the chip or metal turning being cut from the tubular member under a predetermined maximum length of less than around five inches to provide a relatively short length chip or turning as well as providing a chip or turning of a relatively large thickness thereby to minimize internesting of the metal scrap material. The chip breaker may be provided, for example, by a surface irregularity on the cutting surface of the cutting element such as a projection or depression, or the cutting surface may be inclined from a vertical plane in such a manner as to produce a chip breaking effect.

The blades or mounting surfaces for the cutting elements are preferably formed integrally in the tapered tool body by suitable grooving and the cutting elements in each column extend radially outwardly of the associated blade or tool body in a projecting cantilevered fashion. Each cutting element, which is preferably formed of a generally cylindrical or frusto-conical shape, projects radially outwardly of the associated blade or mounting base on the tool body a predetermined amount, such as ⅛ inch for example. Thus, during the scraping or cutting operation for enlarging the inner periphery of the casing or removing burrs, the sharp cutting edges of the cutting elements are initially engaged in a cutting relation and worn away without a wearing away of the blade thereby to reduce frictional contact with the inner surface of the tubular member being enlarged. A depth of cut or bite taken by each blade is between around 0.002 inch to 0.005 inch and such a relatively large thickness of turning or cutting results in a short length which restricts curling or rolling up of the turning thereby making the turnings easy to remove from the well.

A long life blade minimizes the number of trips in and out of the bore hole required for replacement of the tool or blades. The cutting elements are precisely positioned on each blade in an aligned relation with the other cutting elements of a similar shape and size. The leading face of each of the cutting elements may be provided with a negative radial rake with respect to the axis of rotation. The inclination obtained by the negative radial rake aids or assists in turning or directing the extending free end of the metal chip or turning in a forward direction in order to aid in a breaking off of the chip. The leading cutting face of each cutting element, particularly if a substantial negative radial rake is not provided, is preferably formed with an irregularity therein, such as a projection or groove which directs a metal turning or chip forwardly for breaking off a relatively small length metal chip from the tubular member.

It is an object of this invention to provide an improved tapered milling or cutting tool for reaming out collapsed or mashed in casing or the like downhole in a well bore by having a plurality of circumferential spaced blades with each blade having a column of cutting elements thereon of a predetermined similar shape and size.

A further object is to provide such a column of cutting elements on the tool body which includes from the lower end of the column an outwardly tapering column section, a contiguous vertical column section, and a contiguous inwardly tapering column section.

An additional object is to provide such an improved tapered milling tool in which a portion of the cutting elements in each column extend radially outwardly of the supporting surface on the tool body so that the projecting or overhanging extent of the cutting elements wear away without any corresponding wearing away of the supporting surface.

Other objects, features, and advantages of this invention become more apparent after referring to the following specification and drawings.

BRIEF DESCRIPTION OF THE DRAWINGS

FIG. 5 is a bottom plan of a further modification in which separate blades having the cutting elements thereon are shown as secured by welding to the tool body;

FIG. 6 is an elevational view of a separate blade removed from the tool body of FIG. 5; and FIG. 7 is a bottom plan of a modified tapered reaming tool in which the blades and cutting elements are arranged along a spiral path on the tool body.

DESCRIPTION OF THE INVENTION

Figure 1:
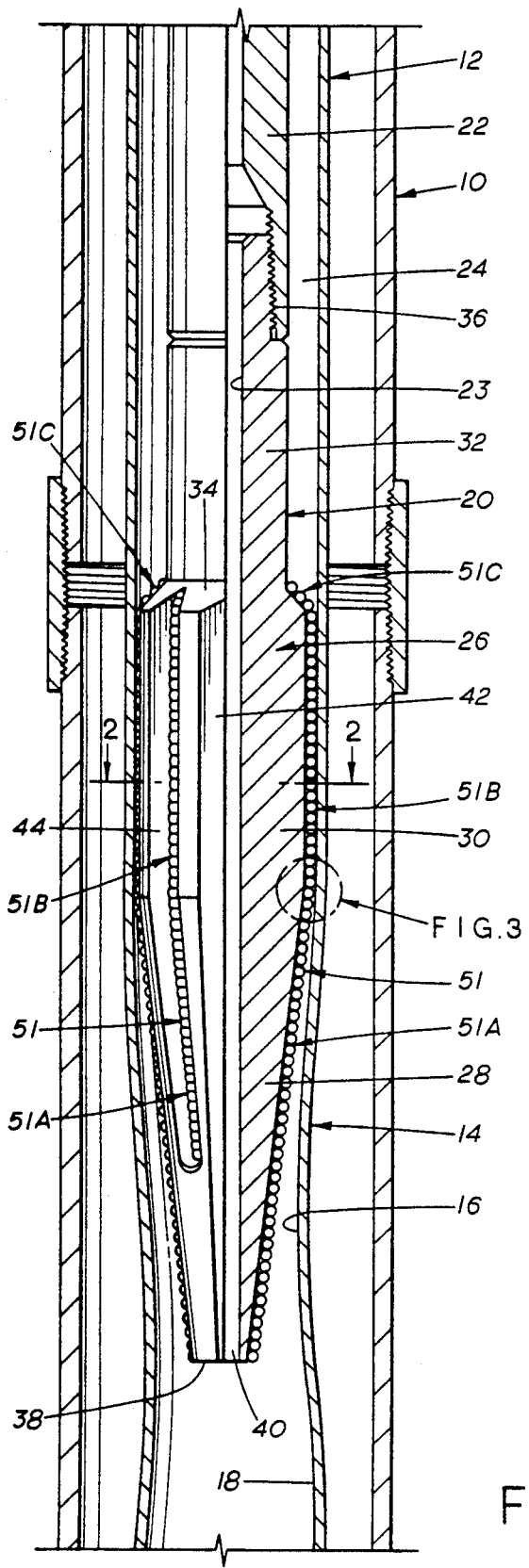
FIG. 1 is a longitudinal section of one embodiment of the tapered milling tool comprising the present invention having a plurality of blades spaced about the tool body with each blade having a single column of cutting elements of a similar size and shape and fitting within a tubular member for reaming out the tubular member.
Figure 3:
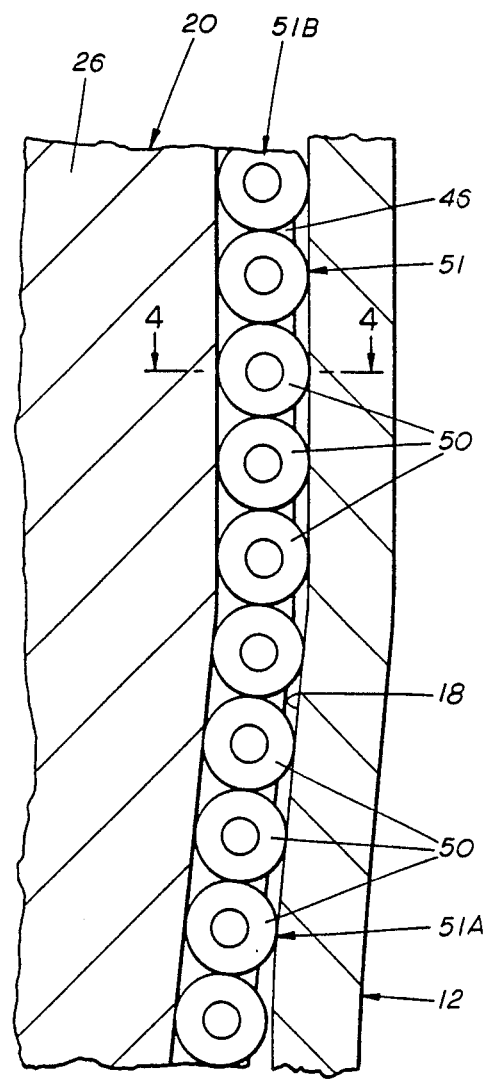
FIG. 3 is an enlarged fragment of FIG. 1 showing the cutting elements at the juncture of the tapered portion and cylindrical portion of the tool body engaging the inner periphery of the tubular member.
Figure 2:
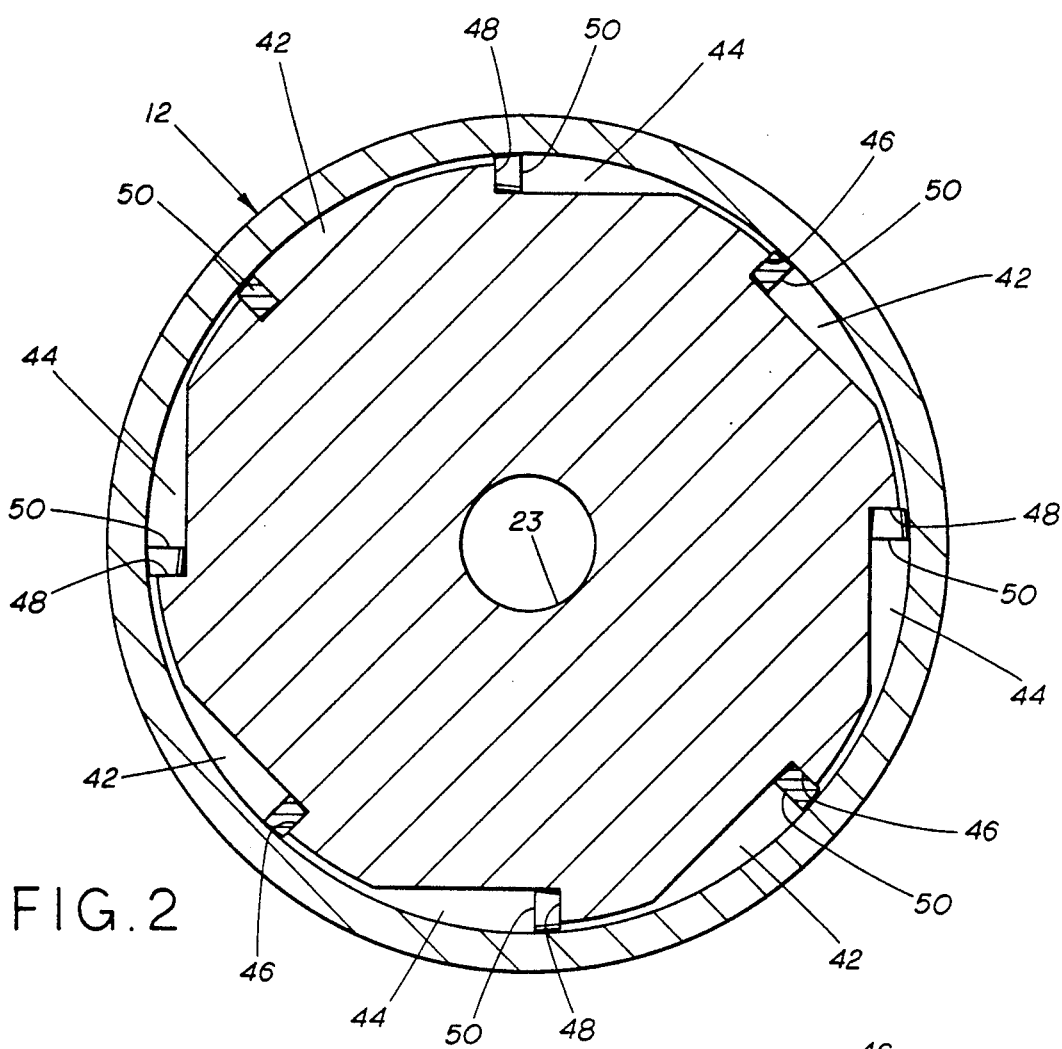
FIG. 2 is a section taken generally along line 2—2 of FIG. 1.

Referring now to the drawings for a better understanding of this invention, and to the embodiment shown in FIGS. 1-4, reference is made to FIG. 1 in which an outer casing 10 is illustrated in a bore hole and receiving an inner casing generally shown at 12 having a mashed-in portion or reduced diameter shown at 14. Mashed-in portion 14 is illustrated with a puncture to form a burr or jagged edge 16 on the inner surface 18 of inner casing 12. A tapered reaming or cutting tool forming the present invention is generally indicated at 20 and is received within inner casing 12 for enlarging inner casing 12 and smoothing inner surface 18 thereof so that suitable fishing tools or the like may be passed through the collapsed or bent in section 14. Tool 20 has an upper sub 22 which is connected at its upper end to a drill string supported from the surface for rotation by suitable power means, as well known. Drilling fluid is supplied through the bore of the drill string and a bore 23 of tool 20 for discharge from the end of tool 20 and return to the surface through an annulus 24 formed between the inner surface 18 of casing 12 and the outer surface of tool 20. The drilling fluid which is discharged from the lower end of tool 20 removes any metal scrap materials, cuttings, chips, or other materials resulting from the enlarging and cutting operation by flushing of the scrap material to the surface for disposal through annulus 24.

Tool 20 has a tool body shown at 26 comprising a tapered lower end portion 28, an integrally connected cylindrical portion 30, and a reduced diameter upper end stem portion 32 connected by a tapered shoulder 34 to cylindrical portion 30. Upper end portion 32 has a threaded end 36 threaded onto sub 20. Lower tapered end portion 28 has a lower annular end surface 38 defining an opening 40 for the discharge of drilling fluid from bore 23.

Tool body 26 has a plurality of alternate grooves or channels 42 of a long length and a plurality of intervening channels 44 of a short length formed along its outer surface by milling or other suitable means and extending along tapered end portion 28, cylindrical portion 30, and upper tapered shoulder 34. Since channels 42 and 44 converge while extending along tapered lower end portion 28, short length channels 44 terminate above the lower end 38 of body 26 while long length channels 42 extend for the full length of end section 28 to lower end 38. Channels 42 and 44 extend through tapered shoulder 34 to provide through channels for the upward flow of drilling fluid and entrained metal scrap material from the bore hole below tool 20 through annulus 24 to the surface.

Blades or planar mounting surfaces 46 and 48 are defined along the trailing sides of respective channels 42 and 44 to provide relatively long blades 46 and relatively short blades 48. Each blade 46, 48 has a single column 51 of cutting elements 50 mounted thereon in end-to-end contact relation and secured to the planar mounting surfaces or blades 46, 48 by suitable brazing or the like. Column 51 includes a lower outwardly sloping column section 51A along lower end body portion 28, a vertical column section 51B along intermediate body portion 30 and an inwardly sloping column section 51C along shoulder 34.

Figure 4:
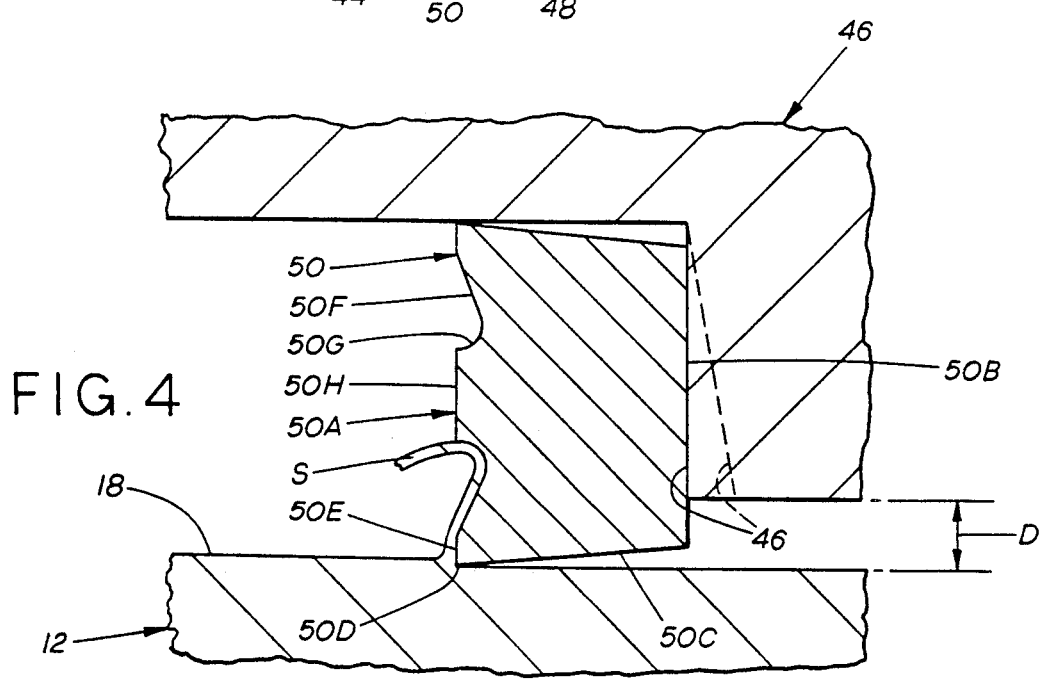
FIG. 4 is an enlarged cross sectional view of a cutting element having an annular groove or depression on its cutting face to form a chip breaker effect and shown engaging the adjacent tubular member in a cutting and smoothing relation.

A disc forming cutting element 50 which has been found to function in a satisfactory manner has a thickness of ¼th inch, a diameter of ⅞ths inch, and is sold by Sandvik Company, located in Houston, Tex. Each cutting element 50 as shown in FIG. 6 is formed of a generally frusto-conical shape having a generally planar front face 50A, a generally planar rear face 50B, and a frusto-conical peripheral surface 50C extending between faces 50A and 50B. A relative sharp cutting edge 50D is formed at the juncture of peripheral surface 50C and front surface 50A. The generally planar front surface 50A includes an annular flat marginal surface portion 50E adjacent edge 50D for reinforcement of edge 50D, and an annular groove 50F tapering inwardly from the flat 50E to define a radius at 50G adjacent a circular center portion 50H of front face 50A. A metal cutting or shaving shown at S in FIG. 4 is received in and rides along tapered groove 50F with the extending end of metal shaving S being directed forwardly and downwardly by radius 50G to facilitate breaking of the metal shaving S from inner periphery 18 of casing 12. Annular groove 50F and radius 50G formed thereby assist breaking of the metal shavings S at a relatively short length of 1-4 inches, for example, and since a substantial thickness of shavings S is provided, the curling or turning up of the ends of the shavings is restricted, thereby to minimize internesting of the metal shavings to facilitate the removal of the turnings from the well bore.

A portion of rear mounting face 50B of each cutting element 50 extends radially beyond its mounting surface as shown at D on FIG. 4 so that a portion of arcuate cutting edge 50D is exposed beyond the adjacent peripheral surface of the tool. For a generally cylindrical cutting element 50 having a diameter of around ½ inch, a projection D of at least around ⅛ inch has been found to be satisfactory. While mounting surface 46 in FIG. 4 is shown in a plane extending parallel to the axis of rotation, it may be desirable to provide a negative radial rake to the cutting face of cutting element 50 and for that purpose mounting surface 46 may be inclined radially as shown in broken lines.

It is noted that cutting elements 50 in column section 51C are mounted along upper tapered shoulder 34 and project upwardly beyond shoulder 34 for exposing a portion of cutting edge 42D. The cutting elements 50 on shoulder 34 are utilized particularly upon removal of tool 20 from inner casing 12 during upward movement of tool 20 to centralize the movement of the tool and to smooth any burrs or the like that might not have been removed earlier or resulted from the downward movement of tool 20. Cutting elements 50 on blades 46 are preferably staggered vertically relative to cutting elements 50 on blades 48 to provide different cutting paths.

While blades 46, 48 have been shown in the embodiment of FIGS. 1-4 as being integral with body 26 of tool 20, separate blades may be provided which may be welded or otherwise secured to the tool body. As shown in the separate embodiment of FIG. 5, separate blades 46A and 48A are shown mounted on a tool body 26A of tool 20A and welded thereto. Cutting elements 50S have their rear faces secured to blades 46A and 48A. Front cutting faces 50A as shown in FIG. 5 extend in a plane through the axis of rotation of tool 20A. Cutting elements 50S are similar to cutting elements 50 in the embodiment of FIGS. 1-4. A separate blade 46A is shown in FIG. 6 removed from tool body 26A. Each blade 46A has a tapered upper shoulder 34A on which cutting elements 50S are secured. As indicated previously, the term "blade" as used in the specification and claims herein is interpreted as including a blade or mounting surface formed integrally with a tool body or a separate blade or mounting surface formed separately and welded or otherwise secured to the tool body.

While blades 46, 48 have been illustrated in the embodiments of FIGS. 1-6 as extending in a plane generally parallel to the longitudinal axis of tool 20, it may be desirable to have such blades extend in a spiral fashion and an embodiment is shown in FIG. 7 in which blades or mounting surfaces 46B and 48B extend in a spiral manner about the outer surface of tool body 26B of tool 20B and have cutting elements 50T secured thereon. It is noted that the front faces of some of the cutting elements 50T are provided with a negative axial rake and some of the front faces are provided with a negative radial rake as a result of being mounted in a spiral fashion which also tends to provide a chip breaker action resulting in short length metal cuttings.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a cutting tool adapted to be positioned within a tubular metal member downhole in a well bore for reaming the inner peripheral surface of the tubular member to a uniform inner diameter and adapted for attachment at its upper end to a drill string for receiving drilling fluid therefrom; said cutting tool comprising:

a tool body having a generally cylindrical intermediate body portion and an integral frusto-conical lower end portion defining the lower end of said tool, said tool body having a central bore therethrough for the discharge of drilling fluid received from said drill string from said lower end;

a plurality of planar mounting surfaces spaced about the outer periphery of said tool body and extending along said generally cylindrical tool body portion and said frusto-conical lower end portion, each mounting surface having on the leading side thereof a channel to permit the upward flow of drilling fluid and entrained metal scrap material; and a single continuous column of cutting elements of a similar shape and size on each of said mounting surfaces arranged generally in an end to end relation, each of said cutting elements having an exposed front cutting face forming a cutting surface, a rear face secured to the associated mounting surface, a peripheral surface extending between said faces, and a relatively sharp edge formed at the juncture of the front face and peripheral surface.

2. In a cutting tool as set forth in claim 1 wherein the front cutting faces of said cutting elements for each column extend in a plane through the axis of rotation.

3. In a cutting tool as set forth in claim 1 wherein each of said cutting elements projects radially a predetermined amount from an associated mounting surface, the radially projecting portion of each cutting element having an arcuate cutting edge for engaging in cutting relation the adjacent inner surface of said metal tubular member.

4. In a cutting tool as set forth in claim 3 wherein said cutting elements are arranged and constructed to act as chip breakers whereby a substantial majority of the metal turnings removed from the inner surface of the metal tubular member have a relatively large thickness and a relatively short length to thereby assist in minimizing internesting of the metal scrap material.

5. In a cutting tool as set forth in claim 4 wherein said cutting elements having outer faces formed with irregularities therein to aid in breaking away of metal turnings from the inner surface of the metal member.

6. In a cutting tool as set forth in claim 4 wherein said tool body is grooved along its length to form said planar mounting surfaces for said cutting elements.

7. In a cutting tool as set forth in claim 4 wherein separate blades are secured to the outer surface of said tool body to form said mounting surfaces and have said cutting elements mounted thereon.

8. In a cutting tool as set forth in claim 1 wherein said mounting surfaces and cutting elements are arranged in a spiral path along the outer periphery of said tool body.

9. In a cutting tool as set forth in claim 1 wherein said mounting surfaces include a plurality of relatively long mounting surfaces arranged in an alternating pattern and a plurality of relatively short length intervening mounting surfaces arranged between each pair of alternating long mounting surfaces.

10. In a cutting tool as set forth in claim 9 wherein cutting elements on adjacent mounting surfaces are staggered in a vertical direction thereby to provide different cutting paths along the inner surface of said tubular metal member.

11. In a cutting tool adapted to be positioned within a metal casing downhole in a well bore for reaming the inner peripheral surface of the casing to a uniform inner diameter; said cutting tool comprising:

a tool body having a reduced diameter upper end stem portion adapted for attachment to a drill string for receiving drilling fluid therefrom, a relatively large diameter generally cylindrical intermediate body portion, an upwardly sloping shoulder connecting said intermediate body portion and said upper end stem portion, an integral tapered lower end portion defining the lower end of said tool, and a central bore through said body for the discharge of drilling fluid received from said drill string from said lower end;

a plurality of blades spaced about the outer periphery of said tool body and extending along said intermediate body portion, said tapered lower end section and said upwardly sloping shoulder, each blade defining on the leading side thereof an adjacent channel through said lower end tapered body portion, said intermediate body portion and said sloping shoulder to permit the upward flow of drilling fluid and entrained metal turnings alongside said tool body and within said casing; and a single continuous column of cutting elements of a similar shape and size on each of said blades arranged generally in end to end relation, said continuous column of cutting elements including an outwardly sloping lower column section on said lower end tapered body portion, a vertical column section on said intermediate body portion, and an inwardly sloping upper column section on said shoulder.

12. In a cutting tool as set forth in claim 11 wherein each of said cutting elements projects radially a predetermined amount from an associated blade, the radially projecting portion of each cutting element having an arcuate cutting edge for engaging in cutting relation the adjacent inner surface of said metal casing.

13. In a cutting tool as set forth in claim 12 wherein said cutting elements are arranged and constructed to act as chip breakers whereby a substantial majority of the metal turnings removed from the inner surface of the casing have a relatively large thickness and a relatively short length to thereby assist in minimizing internesting of the metal scrap material.

14. In a cutting tool as set forth in claim 13 wherein said cutting elements having outer faces formed with irregularities therein to aid in a breaking away of metal turnings from the inner surface of the casing.

15. In a cutting tool as set forth in claim 14 wherein said tool body is grooved along its length to form said blades to define planar mounting surface for said cutting elements.

16. In a cutting tool as set forth in claim 13 wherein separate blades are secured to the outer surface of said tool body and have said cutting elements mounted thereon.

17. In a cutting tool as set forth in claim 11 wherein said blades and cutting elements are arranged in a spiral path along the outer periphery of said tool body.

18. In a cutting tool as set forth in claim 11 wherein said blades include a plurality of relatively long blades arranged in an alternating pattern and a plurality of relatively short length intervening blades arranged between each pair of alternating long blades.

19. In a cutting tool as set forth in claim 18 wherein cutting elements on adjacent blades are staggered in a vertical direction thereby to provide different cutting paths along the inner surface of said casing.

* * * * *

UNITED STATES PATENT AND TRADEMARK OFFICE
CERTIFICATE OF CORRECTION

PATENT NO. : 5,086,838
DATED : Feb. 11, 1992
INVENTOR(S) : Terry E. Cassel; Gerald D. Lynde It is certified that error appears in the above-indentified patent and that said Letters Patent is hereby corrected as shown below:

On the title page, under item [56], References Cited, U.S. Patent Documents, lines 3, 4, and 5, "Lunde," should read --Lynde--.

Signed and Sealed this

Tenth Day of August, 1993

Attest:

MICHAEL K. KIRK

*Attesting Officer*   Acting Commissioner of Patents and Trademarks